(12) United States Patent
Gerhard

(10) Patent No.: US 10,786,908 B2
(45) Date of Patent: Sep. 29, 2020

(54) DEVICE FOR ATTACHING TO A ROBOT

(71) Applicant: SIEMENS AKTIENGESELLSCHAFT, Munich (DE)

(72) Inventor: Detlef Gerhard, Munich (DE)

(73) Assignee: Siemens Aktiengesellschaft (DE)

( * ) Notice: Subject to any disclaimer, the term of this patent is extended or adjusted under 35 U.S.C. 154(b) by 243 days.

(21) Appl. No.: 15/755,146

(22) PCT Filed: Jul. 29, 2016

(86) PCT No.: PCT/EP2016/068138
§ 371 (c)(1),
(2) Date: Feb. 26, 2018

(87) PCT Pub. No.: WO2017/036690
PCT Pub. Date: Mar. 9, 2017

(65) Prior Publication Data
US 2018/0243926 A1 Aug. 30, 2018

(30) Foreign Application Priority Data

Sep. 1, 2015 (DE) .......................... 10 2015 216 659

(51) Int. Cl.
*B25J 15/00* (2006.01)
*B25J 15/06* (2006.01)
(Continued)

(52) U.S. Cl.
CPC .......... *B25J 15/0616* (2013.01); *B25J 15/00* (2013.01); *B25J 19/0075* (2013.01); *B25J 19/06* (2013.01); *Y10S 901/40* (2013.01); *Y10S 901/49* (2013.01)

(58) Field of Classification Search
CPC .... B25J 15/0616; B25J 15/00; B25J 19/0075; B25J 19/06; B25J 9/1656; B25J 9/1692;
(Continued)

(56) References Cited

U.S. PATENT DOCUMENTS 4,650,237 A 3/1987 Lessway
5,360,249 A * 11/1994 Monforte ............. B25J 15/0475
294/119.1
(Continued)

FOREIGN PATENT DOCUMENTS

CN 104418236 A 3/2015
CN 204450571 U 7/2015
(Continued)

OTHER PUBLICATIONS

Detweiler et al., Self-assembling mobile linkages, 2007, IEEE, p. 45-55 (Year: 2007).*
(Continued)

*Primary Examiner* — Mcdieunel Marc
(74) *Attorney, Agent, or Firm* — Schmeiser, Olsen & Watts LLP

(57) ABSTRACT

An adapter which allows an object to be pulled into a chamber after being gripped by a gripper module with a drive, said chamber being formed by an outer shell is provided. The outer shell is designed to at least partly cover the object and is sufficiently large so as to shield the object. The adapter can be understood as a gripper base system to which the gripper module is adapted. The drive pulls the entire gripper module including the object into the gripper base system. The adapter provides a safety gripper system with an object housing for a safe human/robot interaction. The outer shell protects persons from sharp-edged objects
(Continued)

Figure 1:
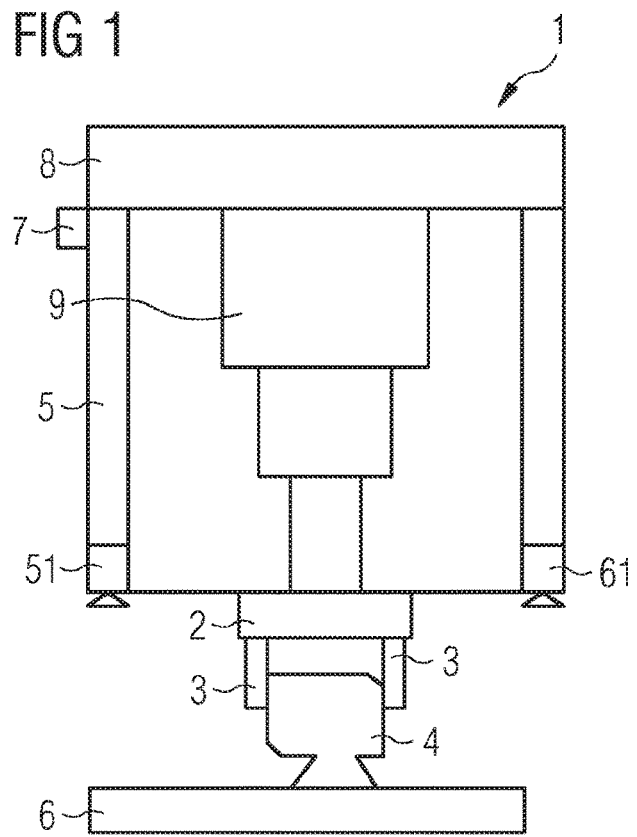

which are gripped by the gripper module and which could otherwise lead to an injury of the persons located in the working area.

20 Claims, 2 Drawing Sheets

(51) Int. Cl.
*B25J 19/00* (2006.01)
*B25J 19/06* (2006.01)

(58) Field of Classification Search
CPC ........ B25J 9/1666; B25J 9/161; B25J 9/1679; B25J 13/088; B25J 15/0475; Y10S 901/40; Y10S 901/49; G08B 13/194
See application file for complete search history.

(56) References Cited

U.S. PATENT DOCUMENTS

| | | | | |
|---|---|---|---|---|
| 7,313,464 | B1 * | 12/2007 | Perreault | B25J 9/1666 318/568.1 |
| 8,095,237 | B2 * | 1/2012 | Habibi | B25J 9/1692 700/245 |
| 8,155,789 | B2 * | 4/2012 | Nagatsuka | B25J 9/1656 219/124.34 |
| 9,844,847 | B2 * | 12/2017 | Suzuki | B25J 9/1679 |
| 9,973,701 | B2 * | 5/2018 | Yamazaki | G08B 13/194 |
| 10,118,295 | B2 * | 11/2018 | Oumi | B25J 9/161 |
| 10,464,217 | B1 * | 11/2019 | Phan | B25J 13/088 |
| 2006/0242785 | A1 | 11/2006 | Cawley et al. | |
| 2011/0176900 | A1 | 7/2011 | Hsieh | |
| 2013/0325181 | A1 | 12/2013 | Moore | |
| 2015/0063963 | A1 | 3/2015 | Kinugawa | |
| 2017/0334066 | A1 | 11/2017 | Levine et al. | |
| 2018/0243926 | A1 | 8/2018 | Gerhard | |

FOREIGN PATENT DOCUMENTS

| | | |
|---|---|---|
| DE | 3610317 A1 | 2/1987 |
| DE | 102008004037 A1 | 7/2009 |
| DE | 102008042260 A1 | 4/2010 |
| DE | 102012217764 A1 | 6/2014 |
| DE | 202013104389 U1 | 1/2015 |
| DE | 102014221645 A1 | 4/2016 |
| EP | 0016921 A1 | 1/1980 |
| EP | 0295208 A1 | 6/1988 |
| JP | S60190590 U | 12/1985 |
| JP | H07112381 A | 5/1995 |
| JP | 2000033592 A | 2/2000 |
| JP | 2004286205 A | 10/2004 |
| JP | 2005199385 A | 7/2005 |
| JP | 2007222962 A | 9/2007 |
| JP | 2009078324 A | 4/2009 |
| KR | 20140125162 A | 10/2014 |
| KR | 20180048889 A | 5/2018 |
| KR | 20190054189 A | 5/2019 |
| TW | 201124322 A | 7/2011 |
| WO | 2015089372 A1 | 6/2015 |

OTHER PUBLICATIONS

Minor et al., An automated tether management system for microgravity extravehicular activities, 2002, IEEE, p. 2289-2295 (Year: 2002).*
Alqasenni et al., Design and Construction of a Robotic Gripper for Activities of Daily Living for People with Disabilities, 2007, IEEE, p. 432-437 (Year: 2007).*
Chen et al., i-Hand: An intelligent robotic hand for fast and accurate assembly in electronic manufacturing, 2012, IEEE, p. 1976-1981 (Year: 2012).*
Japanese Office Action dated Apr. 23, 2019 for Application No. 2018-511224.
Industrieroboter mit Annäherungsdetektion für sichere Mensch-Roboter-Kollaboration, http://www.iff.fraunhofer.de/de/geschaeftsbereiche/robotersysteme/kapazitive-sensorik.html.
Taktile Sensorsysteme, http://www.iff.fraunhofer.de/content/dam/iff/de/dokumente/robotersysteme/themenflyer/2013-03-taktile-sensorsysteme.pdf.
GWS Wechseln—Greiferwechselsystem, http://www.schunk.de/schunk_files/attachments/GWS_064_DE.pdf.
Roboter lernen heute leichter, http://www.produktion.de/automatisierung/robotik-und-handhabung/roboter-lernen-heute-leichter/.
Ii feel you, http://www.kuka-robotics.com/res/sps/a737ee03-5832-4c95-9d91-84e0de80c664_LBR_iiwa_Produkt_Broschuere_DE.pdf.
PCT International Search Report of International Seraching Authority dated Nov. 2, 2016 corresponding to PCT International Application No. PCT /E P201 6/068138 filed Jul. 29, 2016.
Notice of Allowance dated Sep. 27, 2019 for Korean Application No. 10-2018-7009014.
Non-English EP Opposition dated Jun. 3, 2020 for Application No. 16747482.4.
Non-English Chinese Office Action dated Jul. 27, 2020 for Application No. 201680050756.4.

* cited by examiner

DEVICE FOR ATTACHING TO A ROBOT

CROSS-REFERENCE TO RELATED APPLICATIONS

This application claims priority to PCT Application No. PCT/EP2016/068138, having a filing date of Jul. 29, 2016, based on German Application No. 10 2015 216 659.7, having a filing date of Sep. 1, 2015, the entire contents both of which are hereby incorporated by reference.

FIELD OF TECHNOLOGY

According to VDI Guideline 2860, industrial robots are universally employable movement automatons having a plurality of axes, the movements of which are freely programmable and optionally guided by sensors. Such robots may be equipped with grippers and can carry out handling or manufacturing problems.

BACKGROUND

The document "GWS Wechseln—Greiferwechselsystem", available on the Internet on Jul. 23, 2015 from www.schunk.de/schunk_files/attachments/GWS_064_DE.pdf, has disclosed a gripper change system configured to receive different gripper modules, with each of the gripper modules being configured to hold an object.

Such a gripper change system can be assembled on a robotic arm as an adapter, as a result of which the robotic arm can be equipped with different gripper modules.

It is necessary to ensure the safety of humans when working together with robots within the scope of human-robot collaboration. To this end, it is known to house the robot in a secured robot cell, for example.

SUMMARY

An aspect relates to a device for attachment to a robot which provides an alternative to the known art.

According to the embodiment, this aspect is achieved by a device having a gripper module or having a gripper change system configured to receive the gripper module, wherein the gripper module is configured to hold an object. The device has an interface configured to mechanically attach the device to a robot.

The device is characterized by a drive configured to move the gripper module from an extended position into a retracted position. It is furthermore characterized by an outer shell whose dimensions are designed for gripping an object with the gripper module in the extended position and by at least partly covering the gripper module and the object in the retracted position.

In a first variant, the gripper module is installed in the device with the drive being extendable and retractable. In a second variant, the gripper change system is installed in the device with the drive being extendable and retractable, with the gripper module in the gripper change system being able to be flexibly interchanged.

The advantages specified below need not necessarily be obtained by the subject matter of the independent patent claim. Rather, these may also be advantages which are only obtained by individual embodiments, variants or developments.

The device renders it possible to pull the object, after it has been gripped by the gripper module, into a chamber by means of the drive, said chamber being formed by the outer shell. Here, the outer shell is configured to at least partly cover the object and it is sufficiently large to shield the object. The device may be understood to be a main gripper system on which the gripper module is adapted. The drive pulls the entire gripper module and object into the main gripper system.

An adapter is created by the device, said adapter providing a safety gripper system with object housing for a safe human-robot interaction. The outer shell protects the human from sharp-edged objects gripped by the gripper module which could otherwise lead to injury to the persons situated in the workspace. Therefore, the device also allows sharp-edged or sharp objects to be safely transported by the robot.

By way of example, the device can be used for attachment of gripper modules on industrial robots, for example delta robots or articulated robots. Additionally, the device is advantageous in that it can also be used for assembly problems.

According to one embodiment, the outer shell is flexible and equipped with strain sensors, in particular strain gauges. This is advantageous in that contact by the human, which leads to a deformation of the flexible outer shell, can be detected by means of the strain sensors.

In a development, the outer shell is equipped with a capacitive sensor system, in particular a tactile skin, on its surface. The outer shell is, in particular, flexible, soft or cushioned.

This development is likewise advantageous in that contact by the human can be detected.

According to an embodiment, the outer shell has the geometric form of a lateral face of a cylinder or of a prism.

In a development, the gripper module and the gripped object, in the retracted position, are situated completely within a chamber formed by the outer shell.

According to an embodiment, the outer shell is a cover with a planar embodiment or a grid-shaped cover which, in particular, is manufactured from metal tubes or polymer tubes. Cables can be laid within the tubes.

In a development, the drive is at least one pneumatic cylinder, an electric motor or a telescopic drive.

The drive also can be used for quickly receiving objects for which it is not necessary to move the whole robotic arm. The telescopic drive may also be realized as a telescopic mechanism in conjunction with an electric motor and it offers the advantage that the gripper module is extendable by at least the base length of the telescopic mechanism.

According to an embodiment, the interface has a data interface, in particular configured as a fieldbus interface, in particular for a CAN bus or for a PROFIBUS, as a serial interface, in particular FireWire, as an Ethernet or a PROFINET connector, and/or as a WLAN adapter.

Here, the configuration of the data interface as a fieldbus interface, by means of which the device can be connected with automation appliances in addition to other field appliances, sensors and actuators in an industrial installation, is advantageous.

In a development, the interface additionally comprises a first plug-in connection component which provides a control interface with a plurality of contacts suitable for transmitting control signals. Alternatively, or in a complementary manner, the interface additionally comprises a second plug-in connection component which provides an electrical interface for attaching to a load supply.

The device can use the control signals and the load supply for operating both the drive and the gripper module.

According to an embodiment, the interface additionally contains a third plug-in connection component providing a pneumatic interface with connectors for supplying and evacuating pressurized air.

The device can use the pressurized air for operating both the drive and the gripper module.

In a development, the device has at least one first sensor, in particular an image sensor or an infrared point sensor, which is assembled, in particular, at an edge of the outer shell lying opposite the interface.

This is advantageous in that the visual range of the first sensor is restricted neither by the object nor by the outer shell. In contrast to conventional sensor systems, the surroundings are not covered by the object in this case. To the extent that the first sensor is an image sensor, it may also be an infrared image sensor. Furthermore, the image sensor may be equipped with an optical unit, as a result of which the first sensor is embodied as a camera.

According to an embodiment, the device contains a second sensor, in particular an image sensor or infrared point sensor, which is assembled, in particular, on the edge of the outer shell lying opposite the interface, on a side lying opposite the first sensor.

To the extent that the first sensor and the second sensor are image sensors, these may be selected to be CCD sensors or CMOS sensors, for example. By way of example, a temperature point sensor is suitable as an infrared point sensor.

In a development, the device contains a third sensor which is an infrared sensor and configured to monitor a capture region that is larger than a capture region of the first sensor.

The third sensor serves to monitor larger surroundings or greater distances.

According to an embodiment, the device contains a computing unit configured to evaluate signals of the first sensor, wherein, in particular, signals of the second sensor and/or third sensor are also processed. The computing unit is furthermore configured to detect the object on the basis of the signal evaluation.

The corresponding setup of the computing unit consists in suitable programming, for example.

In a development, the computing unit is configured to output results of the signal evaluation via the data interface. This is advantageous in that the information items from the sensors can be pre-processed in the device and forwarded in a compressed form to a superordinate controller.

According to an embodiment, the first sensor and the second sensor are image sensors. The computing unit is configured to evaluate signals from the first sensor and from the second sensor, wherein the computing unit is programmed to calculate a 3-D image information item from 2-D image information items from the sensors, and to output the 3-D image information item via the data interface, in particular in a compressed fashion in the form of vectors.

The robotic arm is equipped with the device. The robot is likewise equipped with the device.

In a development, the robot has a controller configured to detect contact on the basis of signals from sensors of the outer shell and to put the robot into a protection mode, wherein a movement of the robot in the protection mode is, in particular, suspended, slowed down or carried out with a reduced force.

According to an embodiment, the robot has a controller configured to detect contact on the basis of signals from sensors of the outer shell and to learn a movement sequence on the basis of the contact.

BRIEF DESCRIPTION

Figure 2:
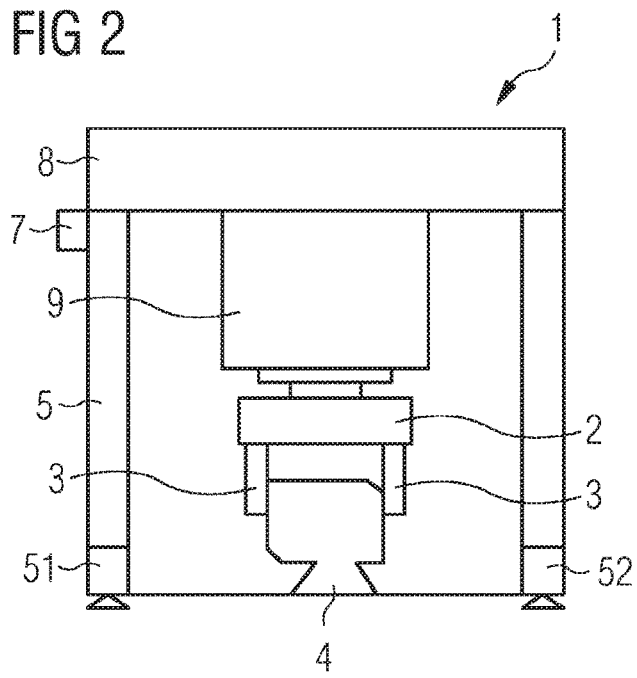
Figure 2:
Figure 3:
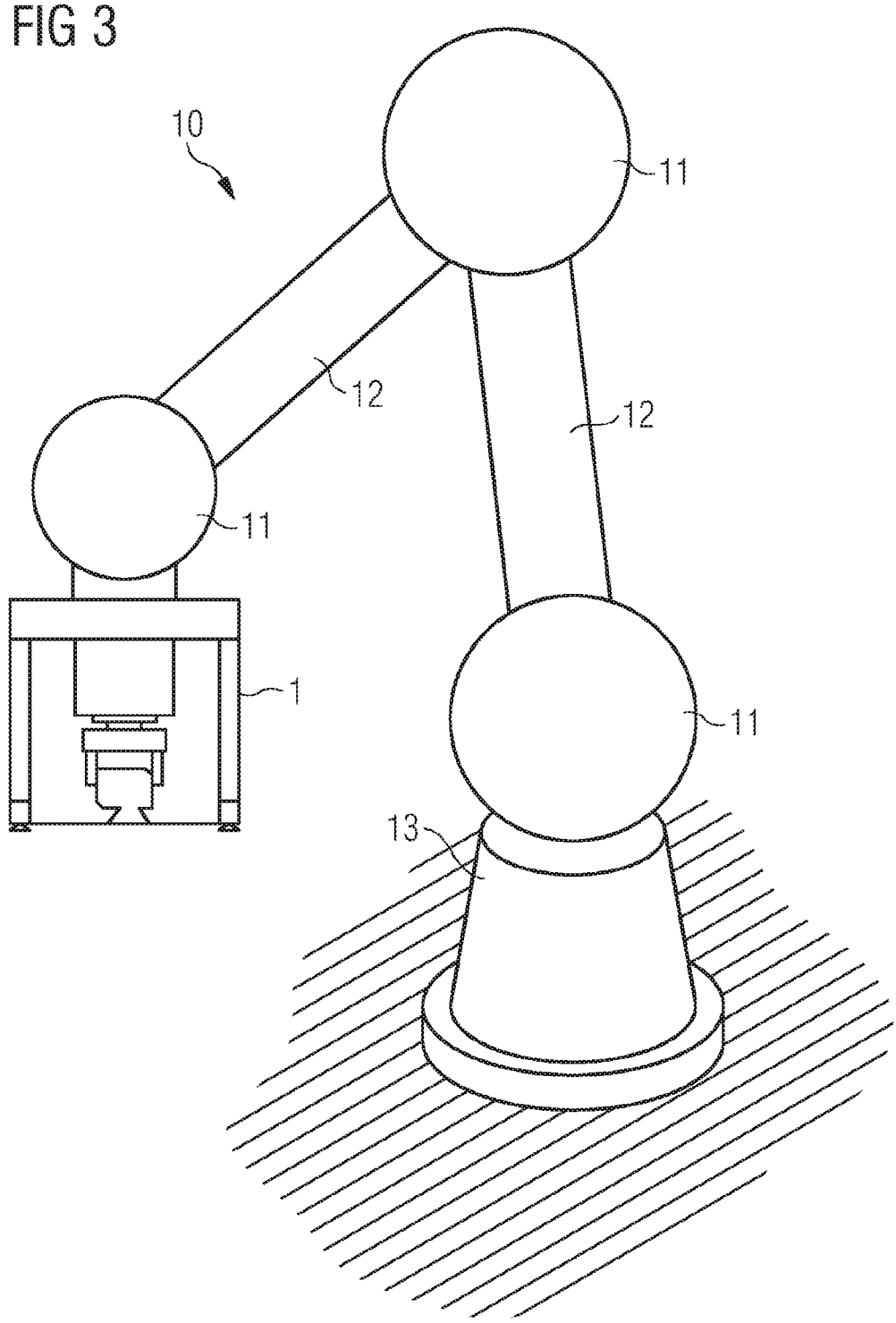

Some of the embodiments will be described in detail, with references to the following Figures, wherein like designations denote like members, wherein:

FIG. 1 shows an adapter for an attachment of a gripper module to a robot, wherein the gripper module is in an extended position for gripping an object, FIG. 2 shows the adapter of FIG. 1, wherein the gripper module is in a retracted position, as a result of which the gripper module and the gripped object are protected and shielded by an outer shell; and FIG. 3 shows the adapter from FIG. 2, which is installed on a robotic arm.

DETAILED DESCRIPTION

FIG. 1 shows an adapter 1 for an attachment of a gripper module 2 to a robot. By way of gripping jaws 3, the gripper module 2 grips an object 4 that has been placed on a worktop 6. To this end, the gripper module 2 was extended by means of a drive 9, in this case a telescopic drive, as a result of which it has left a chamber formed by an outer shell 5. Alternatively, the gripping jaws 3 may also be gripper fingers.

In a first variant, the gripper module is securely connected to the drive 9. In a second variant, a gripper change system is assembled in an extension of the drive 9, it being possible to insert different gripper modules 2 in said gripper change system.

The adapter 1 provides a main gripper system, by means of which different gripper modules can be adapted. On the side opposite the gripper module 2, the adapter 1 has an interface 8 configured for the mechanical attachment of the adapter 1 to a robot. By way of example, the interface 8 is configured for an assembly to a flange at the end of a robotic arm.

In a possible variant of the present exemplary embodiment, the outer shell 5 is flexible and equipped with strain sensors, in particular strain gauges. By way of example, the outer shell 5 is manufactured from a polymer. If the adapter 1 is moved by a robot and it contacts a human, there is a deformation of the outer shell 5 which is detected by means of the strain gauges. This can be signaled to a controller of the robot, as a result of which the robot is put into a protection mode. In the protection mode, the movement of the robot is suspended, slowed down or carried out with a reduced force.

In another variant of the present exemplary embodiment, the outer shell 5 is equipped with a capacitive sensor system, in particular with a tactile skin, on its surface. Here, the outer shell 5 can be rigid or flexible, soft or cushioned.

Appropriate technologies are known from the document "Industrieroboter mit Annaherungsdetektion für sichere Mensch-Roboter-Kollaboration", available on the Internet on Jul. 28, 2015 from www.iff.fraunhofer.de/de/geschaeftsbereiche/robotersysteme/kapazitive-sensorik.html, and the document "Taktile Sensorsysteme", available on the Internet on Jul. 27, 2015 from www.iff.fraunhofer.de/content/dam/iff/de/dokumente/robotersysteme/themenflyer/2013-03-taktile-sensorsysteme.pdf.

The shaping of the outer shell corresponds to a lateral face of a cylinder or of a prism, as a result of which a cylindrical or prism-shaped chamber is formed, into which the drive 9 can completely retract the gripper module 2 with the object 4.

The outer shell 5 either has a planar embodiment or it is only a grid-shaped cover, with the latter, in particular, being manufactured from metal tubes or polymer tubes in which it is advantageously possible to guide cables of sensors.

By way of example, the drive 9 is a pneumatic cylinder, an electric motor or a telescopic drive, for example a telescope spindle drive.

By way of example, the diameter of the outer shell 5 is 50 mm to 100 mm. However, completely different values for this diameter are also possible, for example 10 mm or 20 cm to 50 cm.

For the purposes of transferring information items of a computing unit 7, the interface 8 has a data interface, which is, for example, a fieldbus interface, for instance for a CAN bus or a PROFIBUS, a serial interface, for example FireWire, an Ethernet or a PROFINET connector, and/or a WLAN adapter.

In a variant, the interface additionally contains a first plug-in connection component which provides a control interface with a plurality of contacts suitable for transmitting control signals from a central controller. Here, this is a 25-pin plug-in connector, for example. The interface 8 may moreover have a second plug-in connection component which provides an electrical interface for attaching to a load supply. By way of example, the load supply is a 24 volts load supply, 230 volts load supply or a 400 volts load supply. In a further variant, the interface has a third plug-in connection component providing a pneumatic interface with connectors for supplying and evacuating pressurized air.

The adapter 1 advantageously provides the control signals, the electrical load supply and the pressurized air for the gripper module 2. Further, the pressurized air or the electrical energy can be used for the drive 9.

A first camera 51 is assembled on the lower edge of the outer shell 5, said first camera consisting of an optical unit and a CCD or CMOS image sensor, for example. A second camera 61 is assembled on the opposite side of the lower edge of the outer shell 5. The images of the two cameras 51, 61 can be used to assist the gripping of the object 4 by the gripping jaws 3. To this end, an image evaluation of the camera images is effectuated, for example, in a computing unit 7. The actuation of the gripping jaws 3 is effectuated by the computing unit 7 or by a central controller. In the latter case, the computing unit 7 transmits the camera images or a compressed evaluation of the camera images to the central controller via the data interface. Furthermore, the computing unit 7 can calculate a three-dimensional image information item from the two camera images of the cameras 51, 61 by means of known image processing algorithms, for example edge and object recognition algorithms. Here, the computing unit 7 can reduce the three-dimensional image information to vectors which are transmitted to the central controller via the interface 8.

By way of example, the computing unit 7 is an ARM processor or a DSP processor programmed in a suitable fashion. The cameras 51, 61 can process the light spectrum that is visible to humans, but they may also be selected to be infrared cameras. Furthermore, they may also be a simple infrared point sensor in each case, for example a temperature point sensor.

The adapter 1 may have a further sensor which is an infrared sensor and monitors a capture region that is substantially larger than the capture regions of the cameras 51, 61.

After the gripping jaws 3 have gripped the object 4, the gripper module 2 is retracted by means of the drive 9 into the chamber formed by the outer shell 5.

FIG. 2 shows the adapter 1 after the gripper module 2 was completely retracted into the chamber together with the object 4. The gripper module 2 and the object 4 are covered and shielded, at least to the sides, by the outer shell 5.

FIG. 3 shows the adapter 1 from FIG. 1 and FIG. 2 which is assembled on a joint 11 of a robot 10. The robot 10 has two arm members 12, which are connected to one another via joints 11 and which are assembled on a base 13. Since the gripper module with the object was completely retracted into the chamber of the outer shell in FIG. 3, the robot 10 can displace its arm members 12 at a high velocity without injuring persons by the possibly sharp-edged object 4.

Furthermore, an operator can touch the adapter 1 and activate a learning mode of the robot 10 by actuation of a switch, for example. In the learning mode, the robot 10 can learn a movement sequence on the basis of the touches by the operator, for the purposes of which the operator moves the adapter 1 according to a desired movement sequence, for example.

Appropriate technologies are known from the document "Roboter lernen heute leichter", available on the Internet on Jul. 28, 2015 www.produktion.de/automatisierung/robotik-und-handhabung/roboter-lemen-heute-leichter/, and from the document "ii feel you", available on the Internet on Jul. 27, 2015 from www.kuka-robotics.com/res/sps/a737ee03-5832-4c95-9d91-84e0de80c664_LBR_iiwa_Produkt_Broschuere_DE.pdf.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A device for attaching to a robot, comprising,
    a gripper module or having a gripper change system configured to receive the gripper module, wherein the gripper module is configured to hold an object, and
    having an interface configured to mechanically attach the device to a robot,
    a drive configured to move the gripper module from an extended position into a retracted position, and
    an outer shell whose dimensions are designed for
        gripping an object with the gripper module in the extended position and
        at least partly covering the gripper module and the object in the retracted position.

2. The device as claimed in claim 1,
    wherein the outer shell is flexible and equipped with strain gauges.

3. The device as claimed in claim 1,
    wherein the outer shell is equipped with a capacitive sensor system on its surface and
    wherein the outer shell is flexible, soft or cushioned.

4. The device as claimed in claim 1,
    wherein the outer shell has the geometric form of a lateral face of a cylinder or of a prism.

5. The device as claimed in claim 1,
    wherein the gripper module and the gripped object, in the retracted position, are situated completely within a chamber formed by the outer shell.

6. The device as claimed in claim 1,
    wherein the outer shell is a cover with a planar embodiment or
a grid-shaped cover which is manufactured from metal tubes or polymer tubes.

7. The device as claimed in claim 1,
wherein the drive is at least one pneumatic cylinder, an electric motor or a telescopic drive.

8. The device as claimed in claim 1,
wherein the interface has a data interface configured as
a fieldbus interface,
a serial interface,
an Ethernet or a PROFINET connector, and/or
a WLAN adapter.

9. The device as claimed in claim 1,
wherein the interface additionally
has a first plug-in connection component which provides a control interface with a plurality of contacts suitable for transmitting control signals and/or
has a second plug-in connection component which provides an electrical interface for attaching to a load supply.

10. The device as claimed in claim 1,
wherein the interface additionally
has a third plug-in connection component providing a pneumatic interface with connectors for supplying and evacuating pressurized air.

11. The device as claimed in claim 1,
having at least one first sensor, which is assembled at an edge of the outer shell lying opposite the interface.

12. The device as claimed in claim 11,
having a second sensor which is assembled on the edge of the outer shell lying opposite the interface, on a side lying opposite the first sensor.

13. The device as claimed in claim 11,
having a third sensor which is an infrared sensor and configured to monitor a capture region that is larger than a capture region of the first sensor.

14. The device as claimed in claim 11,
having a computing unit configured to
evaluate signals of the first sensor, wherein, signals of the second sensor and/or third sensor are also processed, and
detect the object on the basis of the signal evaluation.

15. The device as claimed in claim 8,
wherein the computing unit is configured to
output results of the signal evaluation via the data interface.

16. The device as claimed in claim 12,
wherein the first sensor and the second sensor are image sensors and
wherein the computing unit is configured to
evaluate signals from the first sensor and from the second sensor, wherein the computing unit is programmed to calculate a 3-D image information item from 2-D image information items from the sensors, and
output the 3-D image information item via the data interface in a compressed fashion in the form of vectors.

17. A robotic arm, equipped with a device as claimed in claim 1.

18. A robot, equipped with a device as claimed in claim 1.

19. The robot as claimed in claim 18,
having a controller configured to
detect contact on the basis of signals from sensors of the outer shell and
put the robot into a protection mode, wherein a movement of the robot in the protection mode is suspended, slowed down or carried out with a reduced force.

20. The robot as claimed in claim 18,
having a controller configured to
detect contact on the basis of signals from sensors of the outer shell and
learn a movement sequence on the basis of the contact.

* * * * *